(12) United States Patent
Hetland et al.

(10) Patent No.: US 11,929,584 B2
(45) Date of Patent: Mar. 12, 2024

(54) METHOD AND DEVICE FOR MARKING TERMINAL BLOCKS

(71) Applicant: Weidmüller Interface GmbH & Co. KG, Detmold (DE)

(72) Inventors: Detlev Hetland, Detmold (DE); Michael Gockel, Bad Driburg (DE); Jörg Münstermann, Schlangen (DE); Andreas Rutz, Bielefeld (DE); Arnd Schepmann, Detmold (DE); Marco Waldhoff, Sandebeck (DE)

(73) Assignee: Weidmüller Interface GmbH & Co. KG (DE)

( * ) Notice: Subject to any disclaimer, the term of this patent is extended or adjusted under 35 U.S.C. 154(b) by 1007 days.

(21) Appl. No.: 16/613,580

(22) PCT Filed: May 3, 2018

(86) PCT No.: PCT/EP2018/061411
§ 371 (c)(1),
(2) Date: Nov. 14, 2019

(87) PCT Pub. No.: WO2018/215186
PCT Pub. Date: Nov. 29, 2018

(65) Prior Publication Data
US 2020/0083620 A1    Mar. 12, 2020

(30) Foreign Application Priority Data

May 26, 2017    (DE) .......................... 102017111523.4

(51) Int. Cl.
*H01R 9/26* (2006.01)
*B29C 37/00* (2006.01)
(Continued)

(52) U.S. Cl.
CPC ....... *H01R 9/2683* (2013.01); *B29C 37/0028* (2013.01); *B29C 45/0053* (2013.01);
(Continued)

(58) Field of Classification Search
CPC ... B29C 70/742; B29C 70/72; B29C 45/0053; B29C 37/0028; H01R 12/515;
(Continued)

(56) References Cited

U.S. PATENT DOCUMENTS

| 4,609,246 | A |   | 9/1986  | Ustin et al. |
| 5,993,267 | A | * | 11/1999 | Lin ...................... H01R 9/2475 |
|           |   |   |         | 439/709 |
| 6,146,187 | A | * | 11/2000 | Pallai ................... H01R 4/4836 |
|           |   |   |         | 439/441 |

FOREIGN PATENT DOCUMENTS

| DE | 88067      | * | 4/1953 |
| DE | 4223540 A1 |   | 1/1994 |

(Continued)

*Primary Examiner* — Stella K Yi
(74) *Attorney, Agent, or Firm* — LAUBSCHER & FRETWELL P.C.

(57) ABSTRACT

One or more marking elements that can be provided with an inscription are formed on a terminal block which can be mounted on a mounting base or support rail has a housing made of plastic and at least one conductor connections formed in the housing, One or more marking recesses are formed in the housing with each marking recess being designed for the application of a corresponding marking element. The terminal block with the housing is formed by an injection molding toot One or more free spaces are formed in the region of the one or more marking recesses. One or more free spaces are sprayed with a plastic in the region of the marking recesses, whereby one or more inscribable marking elements are formed on the housing.

17 Claims, 8 Drawing Sheets

(51) Int. Cl.
*B29C 45/00* (2006.01)
*B29C 45/14* (2006.01)
*H01R 9/24* (2006.01)
*H01R 12/70* (2011.01)
*H01R 43/18* (2006.01)

(52) U.S. Cl.
CPC ......... *H01R 9/2491* (2013.01); *H01R 9/2608* (2013.01); *H01R 12/7035* (2013.01); *H01R 43/18* (2013.01); *B29C 2037/0035* (2013.01); *B29C 2045/0079* (2013.01); *B29C 45/14336* (2013.01)

(58) Field of Classification Search
CPC .......... H01R 9/28; H01R 9/26; H01R 9/2491; H01R 9/24; H01R 9/223; H01R 9/22; H01R 9/00; H01R 4/28
See application file for complete search history.

(56) References Cited

FOREIGN PATENT DOCUMENTS

| | | | |
|---|---|---|---|
| DE | 2214267 | * | 1/2010 |
| DE | 102009017999 | A1 | 5/2010 |
| DE | 102015102958 | A1 | 9/2016 |
| EP | 0352347 | A1 | 1/1990 |
| EP | 2214267 | A1 | 8/2010 |
| FR | 2773341 | * | 1/1998 |
| FR | 2773341 | A1 | 7/1999 |
| FR | 2917003 | A1 | 12/2008 |
| WO | 2016184457 | A1 | 11/2016 |

* cited by examiner

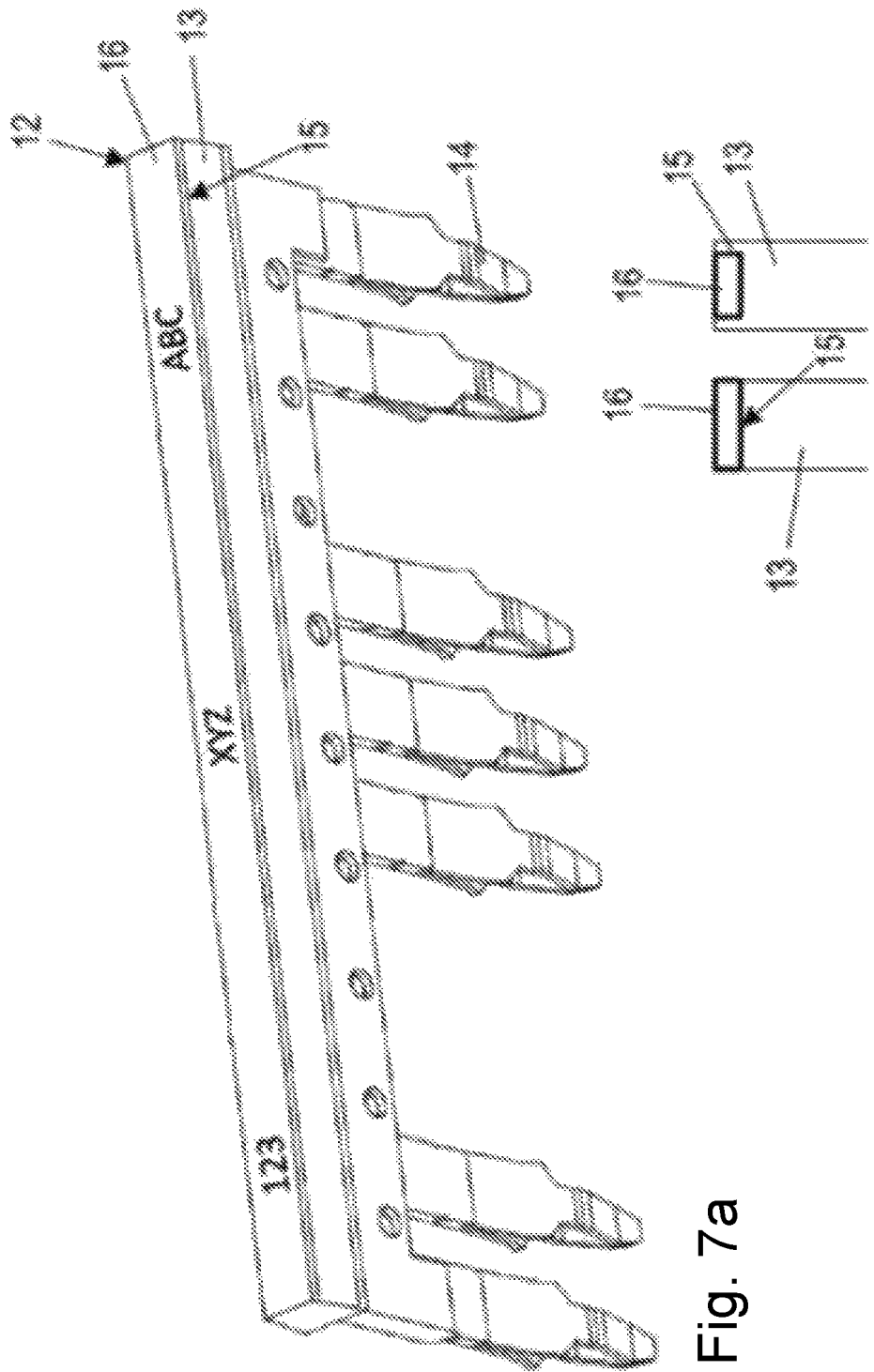

METHOD AND DEVICE FOR MARKING TERMINAL BLOCKS

This application is a § National Stage Entry of international Patent Application No. PCT/EP2018/061411 filed May 3, 2018. Application No, PCT/EP2018/061411 claims priority of DE 202017111523.4 filed May 26, 2017. The entire content of these applications is incorporated herein by reference.

BACKGROUND OF THE INVENTION

The invention relates to a method for marking a terminal block, in particular a terminal block which can be mounted on a mounting base such as a support rail, as well as to a terminal block provided with a marker and to a terminal block arrangement.

It is known to provide terminal blocks with one or more latching grooves which in the case of a terminal block assembly latched to or mounted on a support rail form a latching channel extending across several of the terminal blocks.

Markers in the form of small plastic plates with latching tabs can engage and be latched into the latching grooves.

Examples of terminal blocks with markings are disclosed in U.S. Pat. No. 4,637,676 and GB 2 260 654.

EP 2 214 267 B1 discloses a method for marking a terminal block assembly including individual terminal blocks which are preferably mounted on a mounting base such as a support rail. After the terminal block assembly is mounted on the support rail, a curable plastic molding composition is applied to the terminal block assembly. After curing, the molding composition forms a marking surface which preferably extends across more than one terminal block of the terminal block assembly. The marking surface is provided with an inscription. The spreadable composition is applied onto several terminal blocks and by a dispenser and a shaper such as a spatula which is used to spread the applied composition in order to smoothen it.

However, this prior art technique requires first forming the terminal block assembly and then the terminal block assembly is extended across multiple terminal blocks which is not always possible and can be relatively expensive.

The object of the invention is to provide an improved method for marking a terminal block.

SUMMARY OF THE INVENTION

According to the method, one or more marking elements that can be provided with an inscription are formed on a terminal block which can be mounted on a mounting base and preferably on a support rail, and which has a housing made of plastic and at least one conductor connection formed in the housing. One or more marking recesses are also formed in the housing with each marking recess being designed for the application of a corresponding marking element. A housing is provided on the terminal block either before or after conductor connections are mounted on the housing. The housing is inserted into an injection molding tool where one or more free spaces are formed in the region of one or more marking recesses. The free spaces are sprayed with a plastic in the region of the marking recesses, whereby one or more inscribable marking elements are formed on the housing.

The free space and the housing of the terminal block define the marking recess but for an injection opening. In this manner, a marking element which is well adjusted to the housing is produced.

In this manner, a defined and clearly delimited marking element is formed on the housing of the terminal block. The marking element can easily be provided with an inscription using modern lasers. In particular, an automated formation of the marking elements is possible while according to the prior art, the application of the marking elements on individual terminal blocks of the terminal block assembly was nearly impossible since no defined free space was formed in an injection molding tool.

According to a preferred embodiment, one or more of the marking recesses include one or more undercuts which are suitable for the positive-fitting connection of at least one marking element. In this manner, the marking elements are retained in a simple manner on the housing by a positive fitting as opposed to a bonded connection. With regard to the terminal blocks, this results in the advantage that the same designs of terminal blocks can be used for the attachment of snap-on marking plates or for the overmolding of marking elements. Thus, for a first customer, a batch of terminal blocks without overmolded marking elements can be produced. The customer can then insert snap-on marking elements. However, for another customer who wants to provide an inscription using a robot and/or a laser, another batch of terminal blocks with over-molded marking plates can be produced.

According to an alternate embodiment, a flush surface between the marking elements and the housing of the terminal blocks is produced in the molding tool. The flush surface has no impact on the visual appearance of the terminal blocks and can be provided with easily readable inscriptions.

In addition to the method, a terminal block with one or more marking elements is provided. The terminal block according to the invention should not be interpreted narrowly. It covers electrical terminal blocks for connecting conductors and also other housings that can be arranged in a row on a mounting base.

BRIEF DESCRIPTION OF THE FIGURES

Other objects and advantages of the invention will become apparent from a study of the following specification when viewed in the light of the accompanying drawing, in which:

FIG. 7a is a perspective view of a transverse connector for a terminal block with marking elements formed thereon;

FIGS. 7b and 7c are partial side views alternate embodiments, respectively, of such a transverse connector; and FIG. 8a is a perspective view of an injection molding tool for the attachment of a marking element on a housing of a terminal block and FIG. 8b is a detail enlargement of a portion of FIG. 8a.

DETAILED DESCRIPTION

Figure 1:
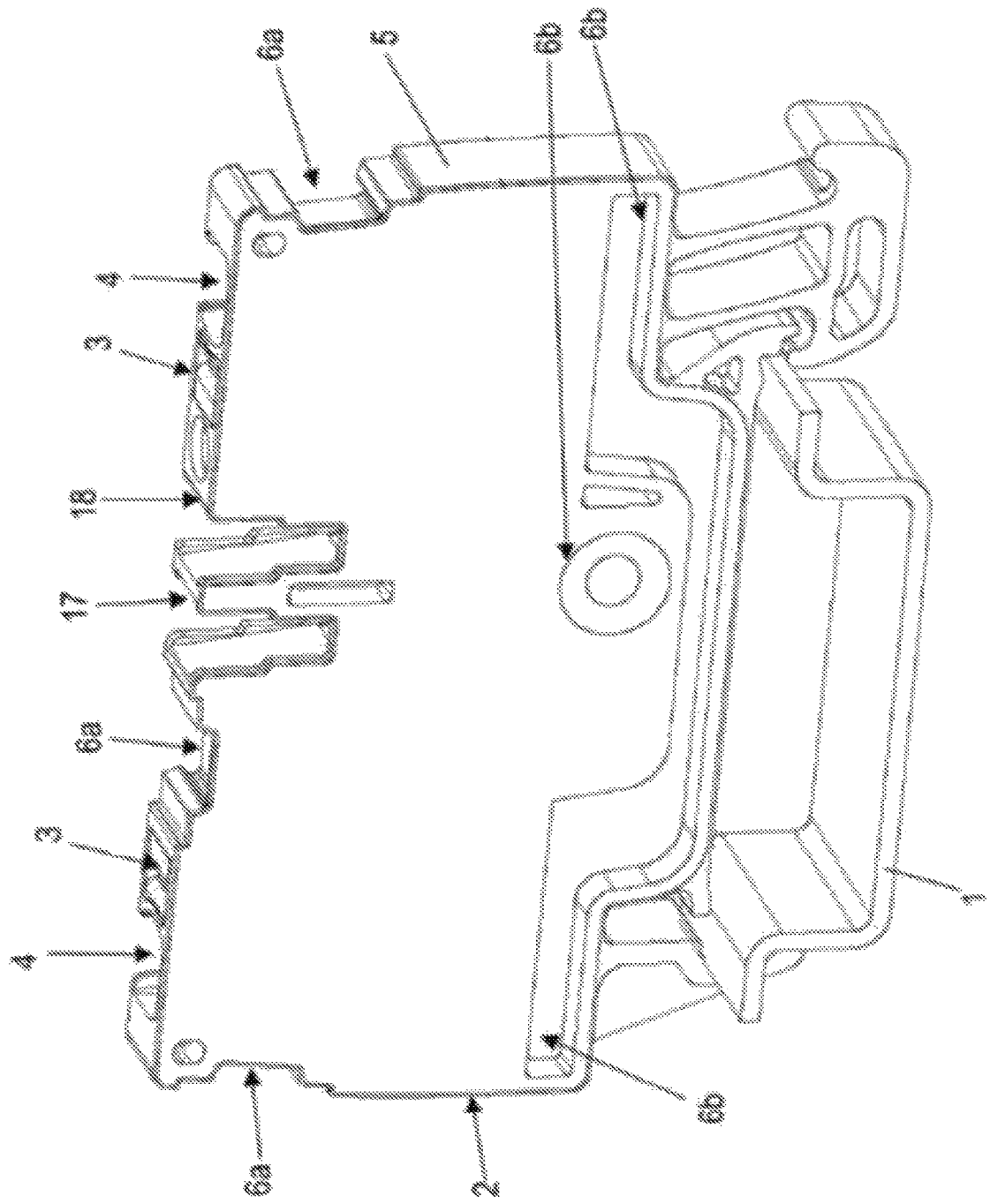
FIG. 1 is a perspective view of a terminal block without a marking element mounted on a support rail.
Figure 6:
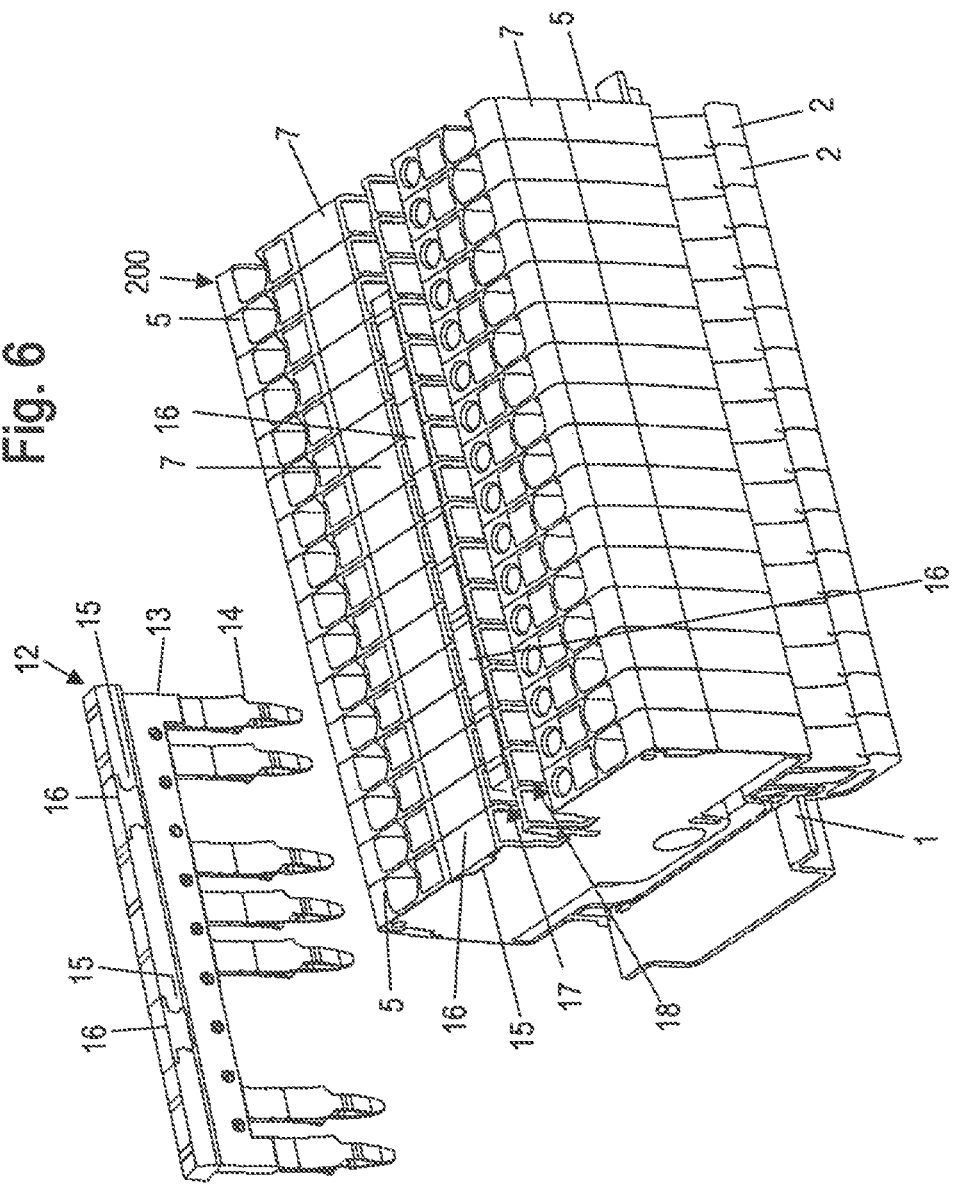
FIG. 6 is an exploded perspective view of a first terminal block assembly of terminal blocks according to the invention and a transverse connector with one or more marking elements formed thereon.

FIG. 1 is a perspective view of a terminal block 2 mounted on a support rail 1, the terminal block being combinable with additional individual terminal blocks on the support rail 1 in order to form a terminal block assembly as shown in FIG. 6.

The terminal block 2 comprises a housing 5 with at least one or more marking recesses 6a, 6b extending in the direction X of a support rail 1 on which the housing is mounted. The housing 5 is designed as a single part or in multiple parts with side and end walls and a base body. The marking recesses 6a are preferably formed as latching grooves. These latching grooves can then form continuous latching channels across multiple terminal blocks 2. The housing 5 is preferably made of a non-electrically conductive plastic. The housing further contains openings 3 for receiving an actuating element and openings 4 for receiving a conductor in a known manner.

Figure 3:
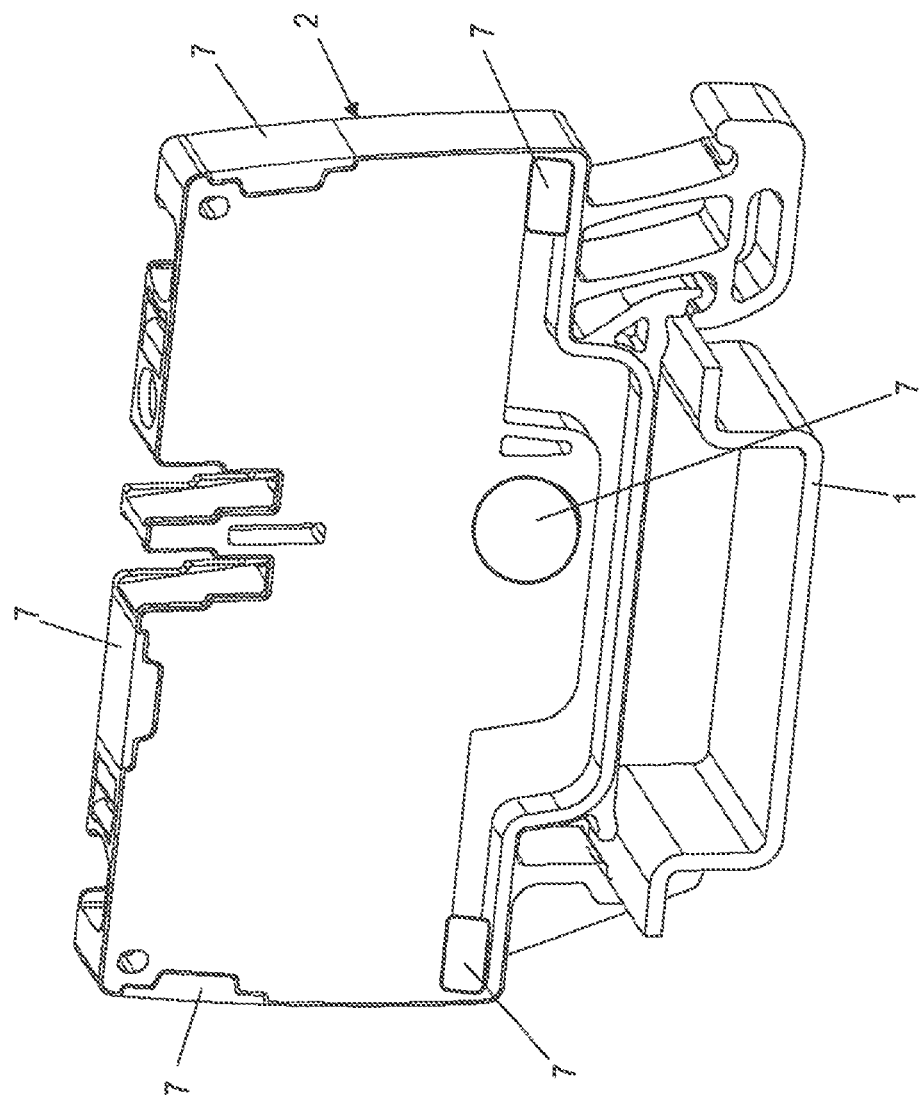
FIG. 3 is a perspective view of the terminal block from FIG. 2 with additional marking elements formed thereon.

As represented in FIG. 3 of EP 2 214 267 and as understood by the person skilled in the art, marking plates can be latched to the marking recesses 6a formed as latching grooves, wherein each of the individual terminal blocks 2 is provided with one of the marking plates. These prefabricated marking plates are preferably made of plastic. As a rule, they are first printed in a printer in accordance with a wiring plan as a mat with a frame and multiple marking plates, then they are detached from a frame and mounted individually after the mounting of the terminal blocks on a support rail. This method to provide terminal blocks 2 with markers has proven itself and is commonly used in the prior art. Nevertheless, the need exists to be able to mark terminal blocks in a simplified and automated manner, in particular with a laser, before or after the terminal blocks are mounted on the support rail.

Figures 8A, 8B:
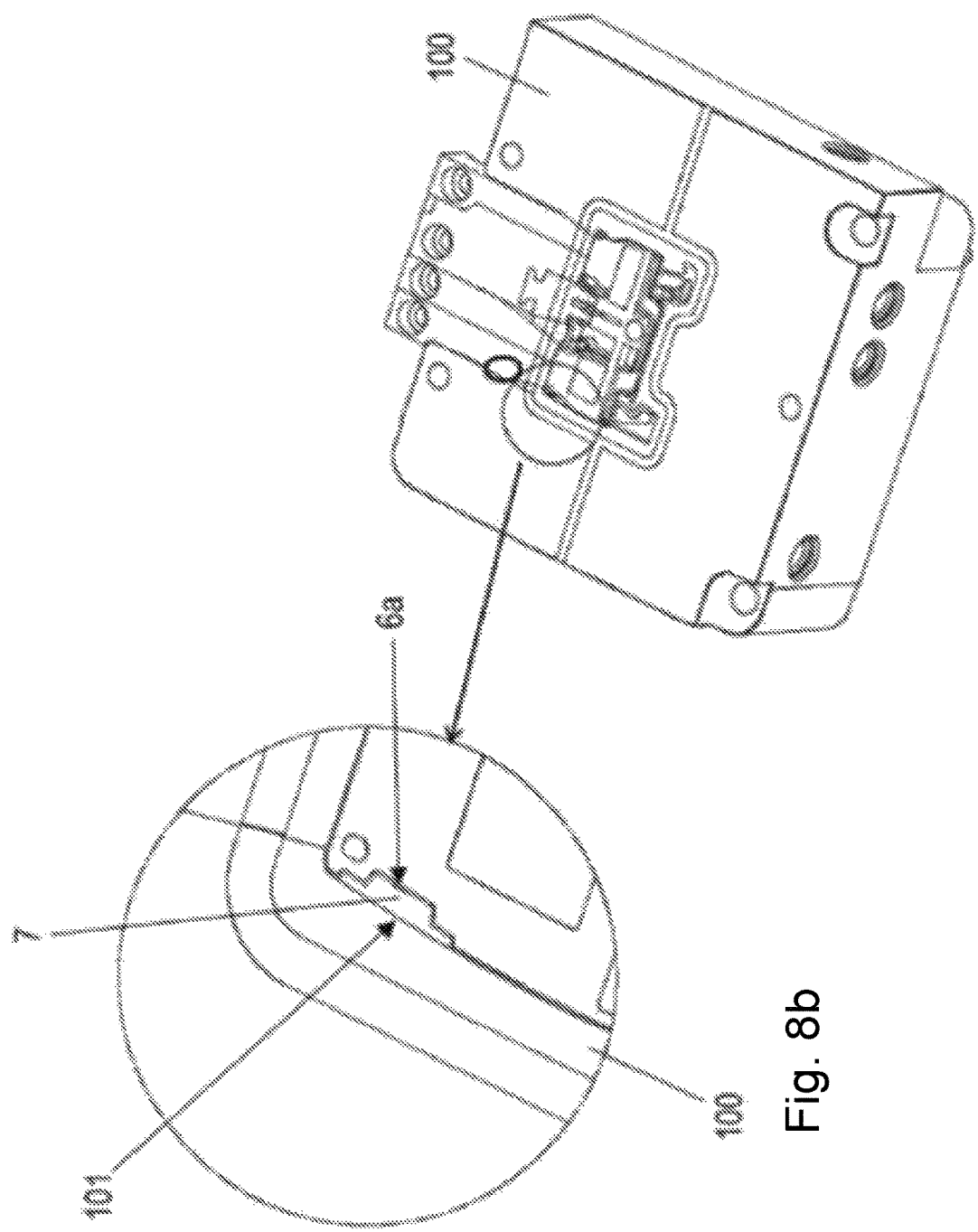

The invention achieves this aim in that a marking element 7 is over-molded on the injection molded housing. FIG. 8a shows an injection molding tool 100 in which a housing 5 is molded. The housing is provided with a free space 101 shown in detail in FIG. 8b which defines a marking recess 6a. The injection molding tool can provide a plurality of free spaces around the circumference of the housing to define one or more marking recesses 6 in the individual terminal blocks, after the production of the respective housing 5 of the terminal blocks 2. Preferably, the over-molding occurs in such a manner that the marking elements 7 end flush with the surfaces of the housing delimiting the marking recess. The application of the marking elements 7 occurs before the terminal block housings are latched to a support rail.

Thereby, on the housing 5 of each terminal block 2, marking elements 7 are formed which are preferably fastened by a positive fit within the recesses 6a but not by a bonding connection. According to FIG. 2, the marking recesses 6a are formed on an upper side facing away from the support rail 1 and in lateral areas of the housing on one or more narrow sides of the housing 5.

The marking elements 7 can then be provided with an inscription before or after mounting on the support rail. This inscription is preferably provided in an automated manner using a laser which modifies the surface of at least one marking element of the respective terminal block 2 by engraving, an application of toner or by another physical-chemical influence in such a manner that an inscription can be seen on the marking element.

The marking recesses 6a are preferably formed as one or more depressions in the housing 5.

It is advantageous that a flush surface be produced in the injection molding tool between the marking elements and the housings 5 of the terminal blocks 2, which does not affect the visual appearance of the terminal blocks and which can be provided with an easily readable inscription.

Figure 2:
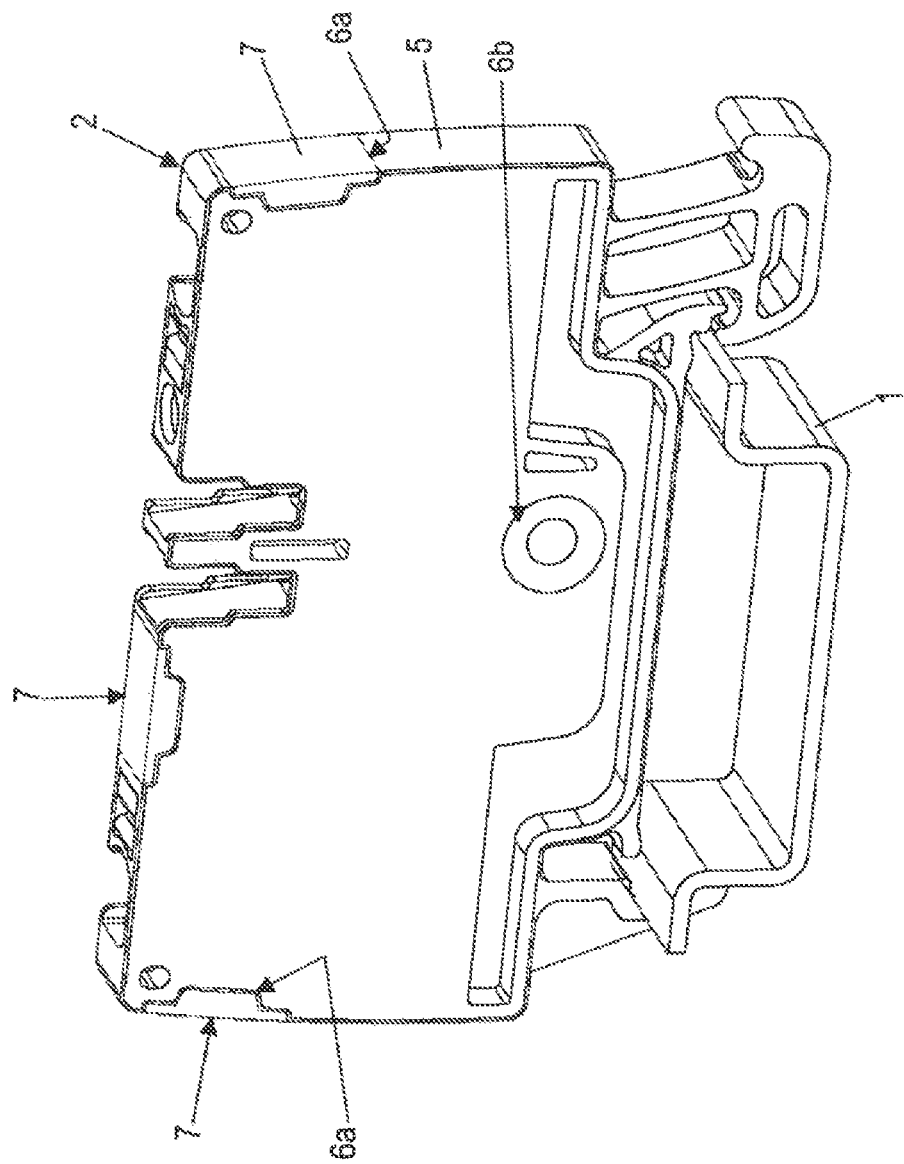
FIG. 2 is a perspective view of the terminal block from FIG. 1 with multiple marking elements formed thereon.

The respective marking recess 6a can be formed as a groove which is formed on the housing in such a manner that, with additional grooves, it forms a continuous marking channel in the row direction or support rail direction X. However, the associated marking element 7 which is injection molded into this respective marking recess 6a does not extend continuously across multiple terminal blocks 2 arranged one after the other in a row but instead ends in the row direction preferably flush with the respective housing 5. FIG. 1 shows three such marking recesses 6a for example on the housing. In FIG. 2, one of the marking elements 7 for each marking recess has been injection molded in a free space 101 of an injection molding tool. The inscriptions can then be applied on surfaces of the housing 5, in particular surfaces that are perpendicular to the row direction X or at an angle.

Another marking recess 6b can also be formed as a depression on the surfaces of the housing 5 which lie in one of the row directions. In the housing 5 of FIG. 1, three such marking recesses 6b are formed as an example. Into the marking recesses marking elements 7 have been formed by overmolding of the marking recesses 6b as shown in FIG. 3 in a free space 101 of an injection molding tool. The inscriptions can then be produced on surfaces of the housing 5, which are oriented parallel to the row direction X.

According to FIGS. 2 and 3, the marking elements end flush with the housing 5 at their edges. This leads to a pleasant overall visual appearance and suitable for the application of an inscription.

Figure 4:
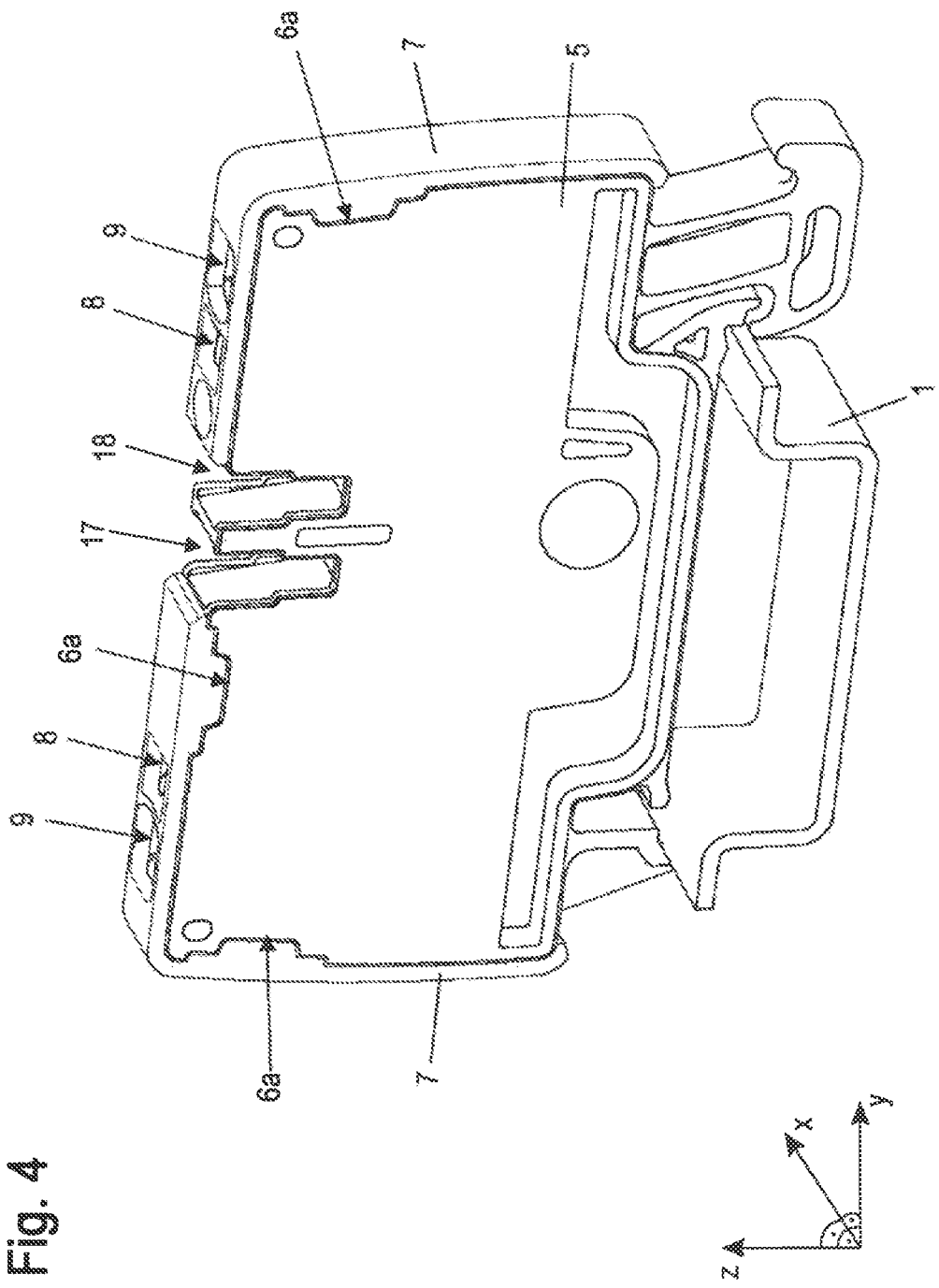
FIG. 4 is a perspective view of the terminal block from FIG. 1 with further marking elements formed thereon.

Alternatively, the respective marking element can also protrude in a defined manner by the injection molding tool in X, Y or Z direction across the corresponding edge of the housing 5 as shown in FIG. 4 or it can be formed as a depression.

Thus, according to the embodiment of FIG. 4, one or multiple marking elements 7 are formed which partially enclose the housing 5 substantially perpendicularly to the row direction X like a shell, in this manner, large marking elements 7 relative to the housing can be formed which can be provided with an inscription covering a particularly large area. These marking elements 7 have one or more openings 8, 9 so as not to cover functional elements such as the openings 3, 4 for conductors or for actuators or pushers for opening a terminal site or the like. In addition, they also can extend around corners of the housing 5.

Figure 5:
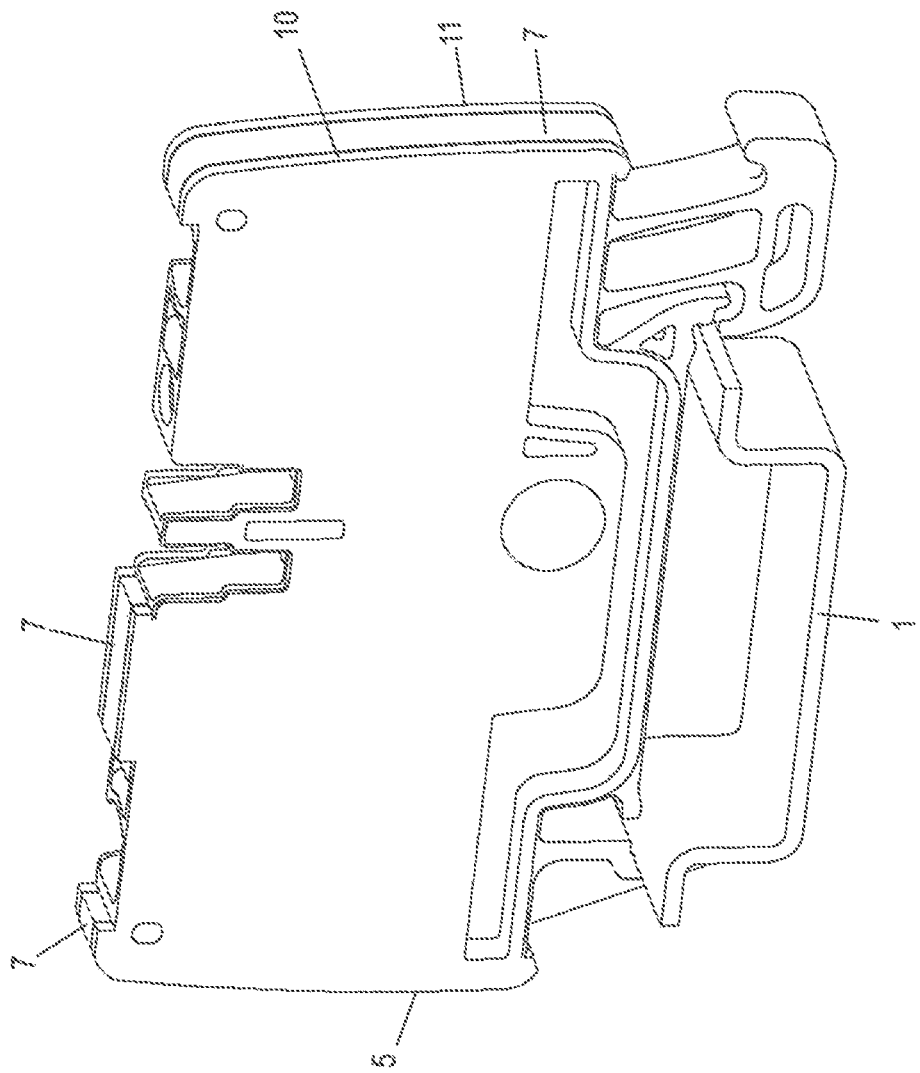
FIG. 5 is a perspective view of an additional terminal block with marking elements formed thereon.

The marking recess 6a can also be formed as a deepened region between walls 10, 11 of the housing 5 which are arranged in the row direction. In this manner, one or more regions arranged in the row direction X can be formed as strip-like marking elements 7 which can also extend around corners of the housing 5 and which can also be provided with a larger or longer inscription as shown in FIG. 5.

The same housing 5 or base terminal blocks 2 can be used for the application of marking plates that can be latched on or for the overmolding of marking elements 7. In comparison to the prior art, the terminal block or the base terminal without a marking plate but preferably with latching recesses for one or more marking plates does not have to be fundamentally changed.

In addition, when a suitable plastic such as a polyamide or a polycarbonate is used, no new electrical approval has to be obtained since the overmolded marking elements, when they are not made of an electrically conductive plastic, do not jeopardize approval.

The marking element 7 can be made of the same plastic as the housing 5. However, the marking element 7 can also be made of another plastic such as a differently colored plastic than the housing 5. Thus, the marking element 7 can be formed to be of a lighter color than the rest of the housing 5. Moreover, the marking element can also be formed of a darker color or even of a completely different color. A functional plastic can also be used, such as a translucent plastic or a fluorescent or phosphorescent plastic, in order to be able to better see the respective marking element 7.

Overmolding of the marking elements occurs after the injection molding of the housing 5, in particular immediately after the injection molding of the housing 5 while still in the injection molding tool in which the housing 5 was injection molded. Then, only the regions for the attachment by injection molding are uncovered, for example, by pulling out a sliding element in which one or more marking recesses 6 have been formed during injection molding of the housing 5. Then, the free spaces formed in such a manner like a kind of mold cavity are sprayed in an additional step in order to form the respective marking elements 7. However, a type of 2K method can also be used.

Moreover, injection molding of the marking elements can also occur later. For this purpose, the terminal blocks 5 are again inserted into the corresponding injection molding tool and then the regions in which the marking recesses 6 have been formed during the first injection molding of the housing 5 are sprayed and then they are sprayed in an additional step in order to form the respective marking elements 7.

The respective marking element 7 is simply held substantially by positive fitting on the respective housing 5. For this purpose, it is advantageous if the corresponding marking recess 6 forms one or more undercuts in order to prevent the respective marking element 7 from falling out. A bonding connection is not formed or it is formed only to an insignificant extent during overmolding of the marking elements 7. The marking elements 7 are seated firmly and securely in this manner. If desired, particularly when they are attached in latching grooves, the marking elements can be pushed out of the housing 5 for example in grooves which are open in the row direction.

FIGS. 6 and 7 each show transverse connectors 12 with a housing 13 made of plastic, with a row of connection elements or plugs 14 for plug sockets and with one or more marking elements 15 which are formed in the housing 13. These marking elements, like the marking recesses 6a of the housings 5 of the terminal blocks 2, are provided with one or more marking elements 16 overmolded in a free space 101 of an injection molding tool. In this manner, the inscription of the transverse connectors for plugging into a transverse connector channel 17, 18 of a terminal block assembly 200 of the terminal blocks 2 (see FIG. 6) is also optimized in a simple manner. With regard to the arrangement and design, the above explanations apply in that they then relate to the housing 5 of the transverse connectors 11. The free space can also extend over the entire length of the transverse connector or across its entire upper surface which faces away from the connection plugs 14. The marking element 16 then also extends over the entire side or surface of the transverse connector which faces the connection plug 14.

On the terminal blocks 2 and/or their transverse connectors 11, one or more surfaces are provided on which laser inscriptions can be produced so that immediately before mounting, the individual terminal block is gripped by a robot, held on a laser and provided with an inscription by the laser.

In this manner in the case of terminal blocks of different size or contours, a respective marker can also be applied in each case.

The invention claimed is:

1. A method with one or more marking elements provided with an inscription are formed on a terminal block which is mounted on a mounting base and has a housing made of a first plastic and at least one conductor connection formed in the housing and at least one marking recess formed in the housing, each marking recess being designed for the application of a corresponding marking element, comprising the steps of:
   a) providing the terminal block with the housing before or after the at least one conductor connections is formed in the housing and providing an injection molding tool into which the housing is inserted, wherein at least one free space is formed in a region of the at least one marking recess; and
   b) spraying the at least one free space with a second plastic in the region of the at least one marking recess, whereby at least one inscribable marking element is formed on the housing.

2. The method as defined in claim 1, wherein at least one marking recess comprises an undercut suitable for a positive-fitting connection of a respective marking element.

3. The method as defined in claim 2, wherein said at least one respective marking element is not connected with the housing by bonding of the first and second plastic materials.

4. The method as defined in claim 1, wherein said at least one marking recess is formed as a latching groove.

5. The method as defined in claim 1, Wherein said at least one marking recess is formed in a first direction on the housing and further comprising the step of providing an inscription on a surface of the respective marking element at an angle relative to the first direction.

6. The method as defined in claim 1, wherein said at least one marking recess is formed in a first direction on the housing and further comprising the step of providing an inscription on a surface of the respective marking element parallel to the first direction.

7. The method as defined in claim 1, wherein said at least one marking element partially encloses the housing.

8. The method as defined in claim 1, wherein said at least one marking element is formed between side walls of the housing.

9. The method as defined in claim 1, wherein all edges of said at least one marking element terminate flush with the housing.

10. The method as defined in claim 1, wherein said at least one marking element protrudes from at least one edge around the housing from a depression relative to said housing.

11. The method as defined in claim 1, wherein said first plastic and said second plastic are the same material.

12. The method as defined in claim 1, wherein said second plastic is at least one of a lighter, darker and a differently colored plastic than said first plastic.

13. The method as defined in claim 1, wherein said first plastic and said second plastic are the same color.

14. The method as defined in claim 1, wherein said second plastic is one of a translucent and fluorescent plastic.

15. The method as defined in claim 1, and further comprising the steps of providing at least one transverse connector including a row of connection plugs for connection with said housing, said transverse connector including at least one marking recess and over-molding at least one marking element in said at least one transverse connector marking recess.

16. The method as defined in claim 1, wherein the at least one free space of the injection molding tool and the housing of the terminal block completely delimit the at least one marking recess except for an injection opening.

17. A terminal block formed using the method of claim 1, and further comprising at least one marking element and at least transverse connector including at least one further marking element.

* * * * *